(12) United States Patent  
Su et al.

(10) Patent No.: US 9,007,759 B2  
(45) Date of Patent: Apr. 14, 2015

(54) DISPLAY MODULE HOLDING FRAME AND METHOD OF MANUFACTURING SAME

(71) Applicant: Sinher Technology Inc., New Taipei (TW)

(72) Inventors: Ting-Hung Su, New Taipei (TW); Wen Yan Lin, New Taipei (TW); Yung-Chang Chiang, New Taipei (TW)

(73) Assignee: Sinher Technology Inc., New Taipei (TW)

( * ) Notice: Subject to any disclaimer, the term of this patent is extended or adjusted under 35 U.S.C. 154(b) by 189 days.

(21) Appl. No.: 13/661,608

(22) Filed: Oct. 26, 2012

(65) Prior Publication Data

US 2014/0118894 A1    May 1, 2014

(51) Int. Cl.
*H05K 7/02* (2006.01)
*H01R 43/00* (2006.01)
*G06F 1/16* (2006.01)
*B29C 45/14* (2006.01)
*B29L 31/34* (2006.01)
*B29L 31/00* (2006.01)
*B29K 21/00* (2006.01)

(52) U.S. Cl.
CPC .......... *G06F 1/1616* (2013.01); *Y10T 29/49117* (2015.01); *B29L 2031/3481* (2013.01); *B29L 2031/721* (2013.01); *B29C 45/14549* (2013.01); *B29C 45/14639* (2013.01); *B29K 2021/00* (2013.01); *B29L 2031/3475* (2013.01); *G06F 1/1637* (2013.01); *G06F 1/1681* (2013.01); *G06F 1/1683* (2013.01)

(58) Field of Classification Search
CPC ....................................................... H05K 7/02
USPC ............. 361/679.01, 679.26, 679.27, 679.28; 29/825; 349/58
See application file for complete search history.

(56) References Cited

U.S. PATENT DOCUMENTS

| | | | | |
|---|---|---|---|---|
| 5,570,267 A | * | 10/1996 | Ma ........................... | 361/679.21 |
| 5,666,172 A | * | 9/1997 | Ida et al. ..................... | 349/58 |
| 6,667,779 B2 | * | 12/2003 | Lee ............................ | 349/58 |
| 7,843,526 B2 | * | 11/2010 | Lee et al. ...................... | 349/58 |
| 8,210,718 B2 | * | 7/2012 | Tsai et al. ................... | 362/249.06 |
| 8,373,974 B2 | * | 2/2013 | Hiratomo et al. ......... | 361/679.01 |
| 8,625,291 B2 | * | 1/2014 | Yu et al. ...................... | 361/752 |
| 2009/0122476 A1 | * | 5/2009 | Won et al. ................. | 361/679.21 |
| 2014/0118894 A1 | * | 5/2014 | Su et al. ..................... | 361/679.01 |

FOREIGN PATENT DOCUMENTS

| | | |
|---|---|---|
| TW | M290569 | 5/2006 |
| TW | M302711 | 12/2006 |
| TW | M430140 | 5/2012 |

* cited by examiner

*Primary Examiner* — Lisa Lea Edmonds
*Assistant Examiner* — Rashen E Morrison
(74) *Attorney, Agent, or Firm* — Muncy, Geissler, Olds & Lowe, P.C.

(57) ABSTRACT

A display module holding frame and method of manufacturing same include the steps of: first, providing a support frame which includes an installation frame to hold a display module, two installation portions to hold two hinge structures, an installation space formed within the installation frame, a coupling space formed between the two installation portions and a wiring passage communicating with the installation space and the coupling space; next, threading a signal wire through the wiring passage; finally, forming a rubber protective layer on the surface of the support frame via an injection process. The rubber protective layer has a holding portion to fix the signal wire in the wiring passage. The display module holding frame thus formed provides a structure to securely hold the signal wire without moving freely.

11 Claims, 8 Drawing Sheets

DISPLAY MODULE HOLDING FRAME AND METHOD OF MANUFACTURING SAME

FIELD OF THE INVENTION

The present invention relates to a frame and method of manufacturing same and particularly to a display module holding frame and method of manufacturing same.

BACKGROUND OF THE INVENTION

Advance of technology has made electronic devices indispensable in the life of modern people. Nowadays most people rely on various types of electronic devices to handle all sorts of matters in life efficiently. At present electronic devices are not limited to be used in a single place like in the past. Portable electronic products are widely available now that greatly enhance people's work efficiency. But the portable electronic products like a notebook computer are quite heavy and troublesome for people to carry around that become a burden for most people, or even have the risk of straining people's muscles after carrying it for a long time. To alleviate user's burden, thinner and lighter portable electronic products have become a prevailing design trend in recent years.

The structure of an electronic device generally includes a base, a display panel that can be flipped to open or close against the base and a hinge structure to pivotally connect to the base and display panel. More specifically, a conventional display panel as disclosed in TW patent No. M290569 is a liquid crystal display comprising a frame, a holding rack, a liquid crystal screen and a rear cover. The liquid crystal screen is installed in the frame. The holding rack is installed between one side of the liquid crystal screen and the frame. The frame is installed on the rear cover. The holding rack has a plurality of holding slots run through by a plurality of fastening elements to fasten the holding rack to the frame. TW patent No. M302711 discloses another type of liquid crystal display which comprises a frame, a liquid crystal screen, a first holding rack, a second holding rack, at least one slider and a rear cover. The first and second holding racks are fastened to the frame. The liquid crystal screen has one side fastened to the first holding rack. The rear cover is latched on the frame. The slider is slidably installed on the second holding rack. The liquid crystal screen has another side fastened to the slider which in turn is fastened to the frame via a fastening element. All the aforesaid display panels are assembled via a front cover, a rear cover, at least one frame and a liquid crystal screen. The fastening structures of the liquid crystal screens thus formed are quite complex and complicated in assembly and operation, hence production costs are higher and production efficiency is lower. Moreover, as the display module has to be held via the front cover and rear cover, thus the thickness is greater. All these make the requirements of thinner and lighter design more difficult or even impossible.

To resolve the aforesaid problems, the Inventor has proposed a novel frame disclosed in TW patent No. M430140 which comprises an assembly portion and a base rack at a lower end of the assembly portion. The assembly portion includes a first bridge portion. The base rack has a coupling portion corresponding to the first bridge portion, a bushing located inside the coupling portion and a pintle inserted into the bushing. As the assembly portion functions as a frame for the display module and a front cover and a rear cover, and they are assembled by stacking, the space for the front cover and rear cover to hold the display module can be saved. But for wiring arrangement in such a structure, the wires run through the pintle, bushing and coupling portion to connect to the display module without being held. As a result, the wires are prone to be squeezed and moved or even bent during repetitive open and close of the display screen to result in damage of the wires and shorten the lifespan thereof.

SUMMARY OF THE INVENTION

The primary object of the present invention is to solve the problem of the conventional frames in which the wires cannot be fixedly held to result in easy moving of the wires or even squeezing and bending of the wires that could cause damage thereof.

To achieve the foregoing object, the present invention provides a method for manufacturing a display module holding frame. The display module holding frame is installed on an electronic device. The electronic device includes a base and two hinge structures to pivotally couple with the base and the display module holding frame. The method includes the steps as follows:

providing a support frame which includes an installation frame to hold a display module, two installation portions connected to the installation frame to hold the hinge structures, an installation space formed within the installation frame and a coupling space formed between the two installation portions; the installation frame including a wiring passage communicating with the installation space and coupling space;

threading a signal wire through the wiring passage to coupled with the support frame; and forming a rubber protective layer on the surface of the installation frame that includes a buffer portion bonded between the surface of the installation frame and the display module, and a holding portion held in the wiring passage to fix the signal wire so that the signal wire and the installation frame form a positioning relationship.

In one aspect, the step of forming the rubber protective layer on the surface of the installation frame further includes the steps as follows:

disposing the coupled support frame and signal wire in a mold for holding a rubber material, the mold including a male mold and a female mold to hold the coupled support frame and signal wire; and injecting the rubber material to the surface of the installation frame to form the buffer portion and fill in the wiring passage to encase the signal wire to form the holding portion.

In another aspect the two hinge structures respectively include a fastening portion fastened to the base and a pintle portion located in one of the two installation portions to rotate against the fastening portion.

In yet another aspect the method for manufacturing the display module holding frame further includes a step of threading the signal wire through the pintle portion after the step of providing the support frame; the pintle portion including an axial aperture communicating with the wiring passage to be threaded through by the signal wire.

In yet another aspect the method for manufacturing the display module holding frame further includes a step of assembling the installation frame that is performed before the step of providing a support frame; the installation frame including a side frame to support the display module and a bottom frame connecting to the installation portions to form the installation space.

In yet another aspect the signal wire includes a signal transmission section encased by the holding portion and two connection ports located at two ends of the signal transmission section.

To achieve the foregoing object, the invention also provides a display module holding frame that is located in the electronic device. The electronic device includes a base and two hinge structures to pivotally couple with the base and the display module holding frame so that the display module holding frame is rotatable against the base. The display module holding frame includes a support frame and a rubber protective layer located on the support frame. The support frame includes an installation frame to hold a display module, two installation portions connecting to the installation frame to hold the hinge structures, an installation space formed within the installation frame to hold the display module and a coupling space formed between the two installation portions. The installation frame includes a wiring passage communicating with the installation space and coupling space and threaded through by a signal wire. The rubber protective layer includes a buffer portion bonded between the surface of the installation frame and display module and a holding portion held in the wiring passage to fix the signal wire so that the signal wire and the installation frame form a positioning relationship.

In one aspect the two hinge structures respectively include a fastening portion fastened to the base and a pintle portion located in one installation portion to rotate against the fastening portion.

In another aspect the pintle portion includes an axial aperture communicating with the wiring passage.

In yet another aspect the installation frame includes a side frame to support the display module and a bottom frame connecting to the installation portions and incorporating with the side frame to form the installation space.

In yet another aspect the signal wire includes a signal transmission section encased by the holding portion and two connection ports located at two ends of the signal transmission section.

The invention thus formed provides many benefits, notably:

1. The display module holding frame made via the aforesaid manufacturing method has the signal wire fixed by the holding portion of the rubber protective layer in the support frame, hence the signal wire cannot pulled to move while the support frame is opened or closed against the base.

2. The buffer portion of the rubber protective layer is located between the display module and installation frame, thus can absorb the impact while the display module holding frame is opened or closed against the base, thereby providing protection for the display module.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
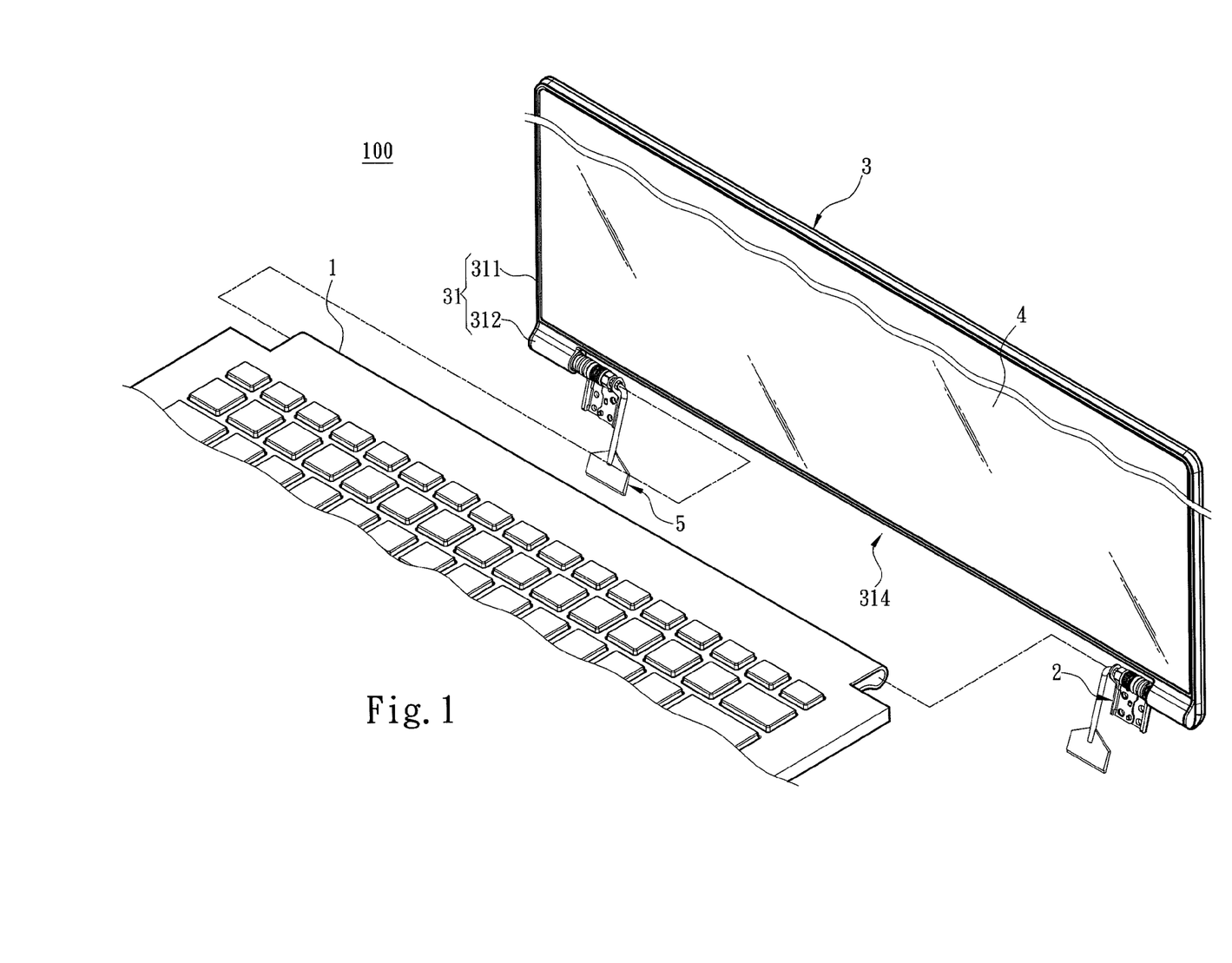
FIG. 1 is a schematic view of an embodiment of a display module holding frame of the invention.

Please refer to FIG. 1, the present invention aims to provide a display module holding frame that is located in an electronic device 100. The electronic device 100 includes a base 1 and two hinge structures 2 to pivotally couple with the base 1 and the display module holding frame 3 such that the display module holding frame 3 is rotatable against the base 1. In this embodiment the electronic device 100 can be a notebook computer. The base 1 is a keyboard for inputting signals. The two hinge structures 2 couple the base 1 with the display module holding frame 3, but this is not the limitation of the invention. The present invention also is adaptable to other types of electronic devices 100 such as a flip cell phone or personal digital assistant (PDA).

Figure 2:
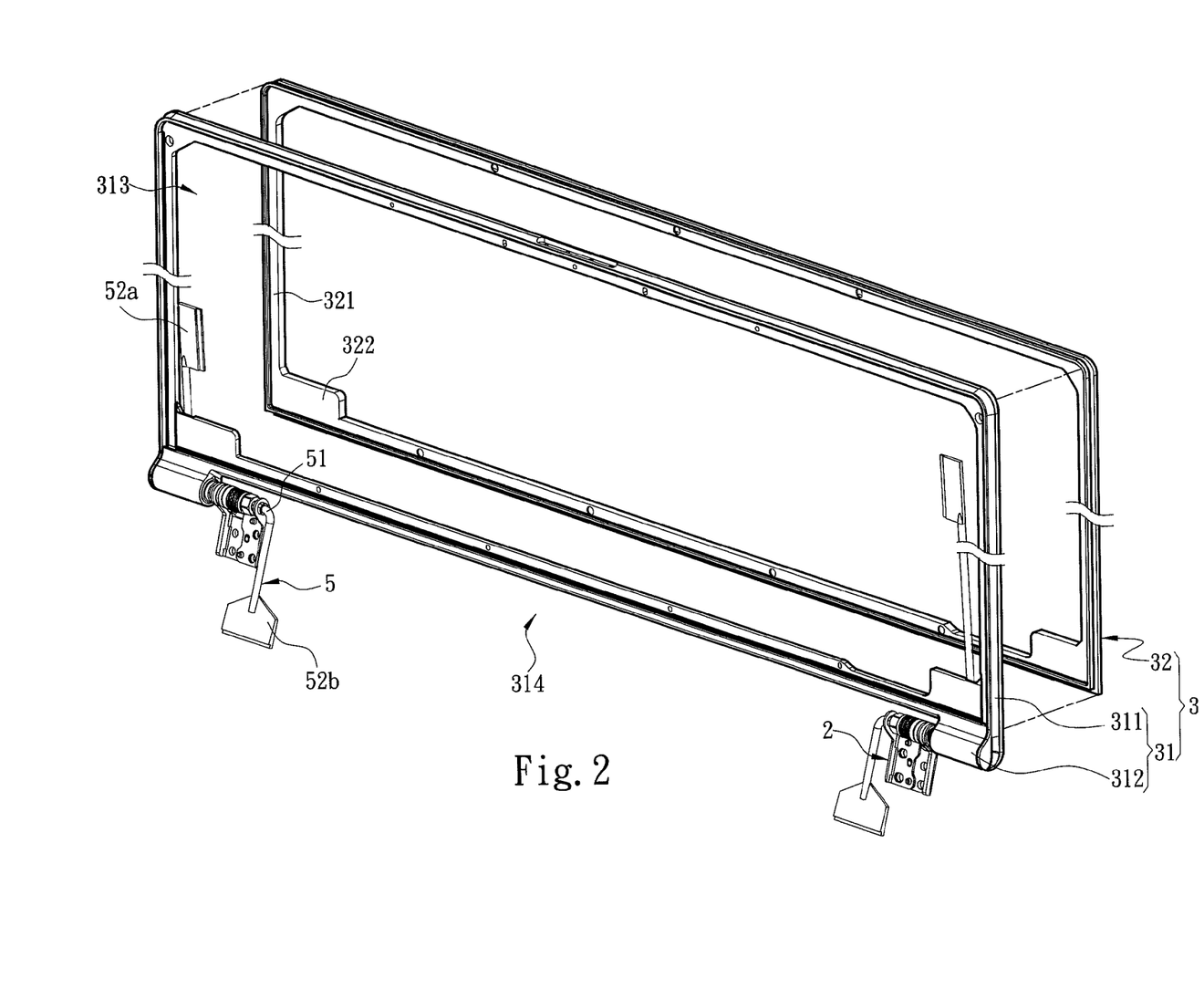
FIG. 2 is an exploded view of the display module holding frame of the invention.
Figure 3:
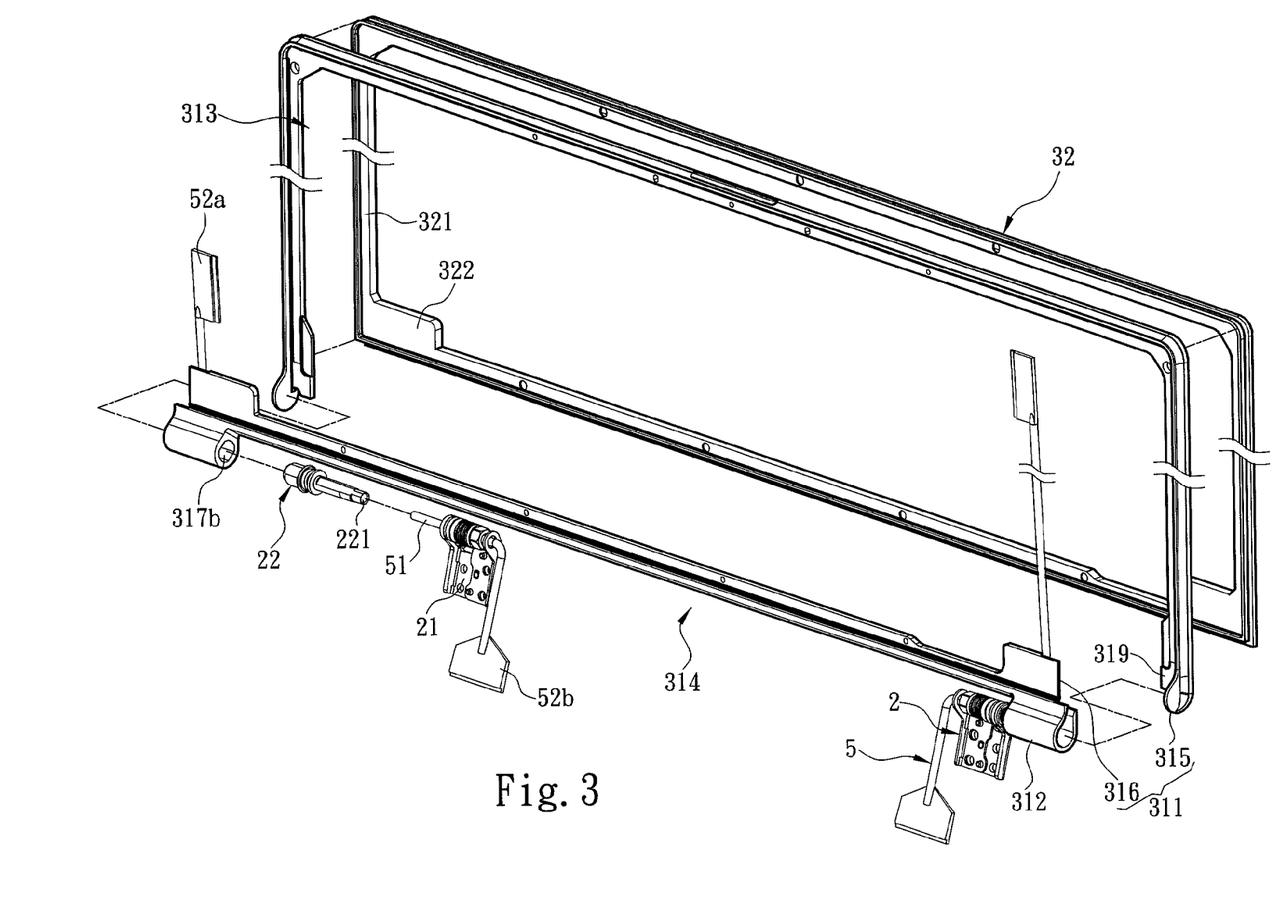
FIG. 3 is another exploded view of the display module holding frame of the invention.
Figure 4:
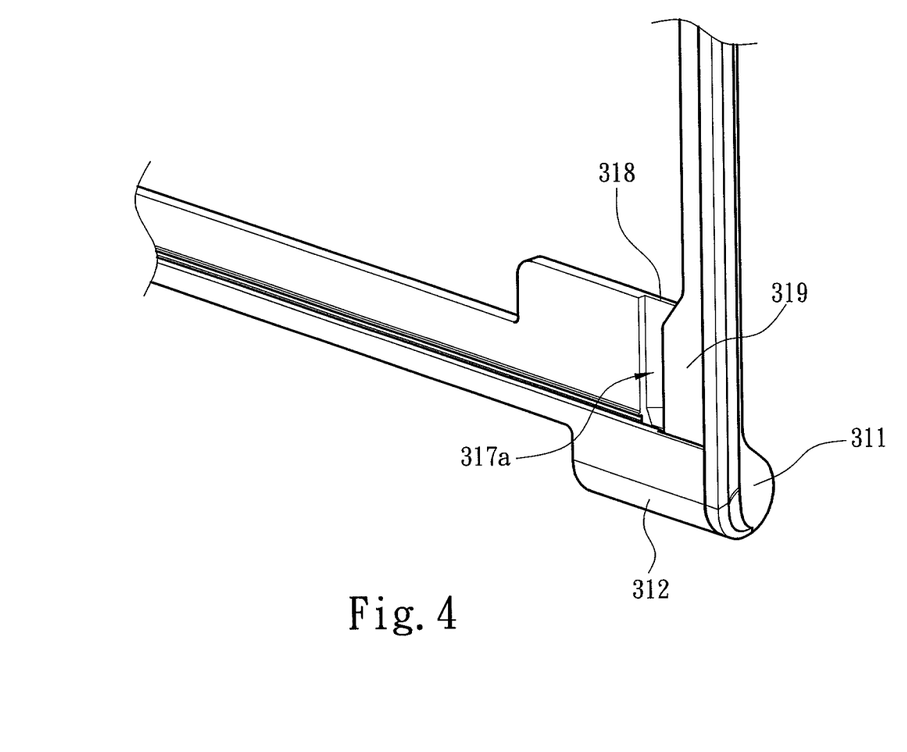
FIG. 4 is a partial perspective view of the display module holding frame of the invention.

Please refer to FIGS. 2, 3 and 4, the display module holding frame 3 comprises a support frame 31 and a rubber protective layer 32 located on the support frame 31. The support frame 31 includes an installation frame 311 to hold a display module 4, two installation portions 312 connecting to the installation frame 311 to hold the two hinge structures 2, an installation space 313 formed within the installation frame 311 to hold the display module 4 and a coupling space 314 formed between the two installation portions 312. The display module 4 can be a backlight module (such as edge-type LED backlight module, edge-type CCFL backlight module or direct-type CCFL backlight module), a liquid crystal mask (such as TFT-LCD (Thin film transistor liquid crystal display), TN (Twisted Nematic), PVA (Pattern Vertical Alignment), S-PVA (Super Pattern Vertical Alignment), S-IPS (Super-In Plane Switching), P-MVA (Premium Multidomain Vertical Alignment) or S-MVA (Super Multidomain Vertical Alignment)), and a polarizer with multiple layers stacked one another. In this embodiment the installation frame 311 is a composite frame, and includes a side frame 315 to hold the display module 4, a bottom frame 316 connected with the installation portions 312 and the side frame 315 to form the installation space 313, and a wiring passage 317 communicating with the installation space 313 and coupling space 314 and threaded through by a signal wire 5 (also referring to FIG. 5A). More specifically, the side frame 315 is a metal frame formed in an inverted U shape, while the bottom frame 316 is an I-shaped metal frame. The side frame 315 and the bottom frame 316 are coupled to form the rectangular installation frame 311 with the installation space 313 formed inside. The bottom frame 316 and side frame 315 include respectively an indented portion 318 and a connecting portion 319 at the junction, and the connecting portion 319 is connected to the indented portion 318 to form a recess 317a communicating with the installation space 313. Each of the two installation portions 312 has a housing space 317b communicating with the recess 317a and coupling space 314 to hold one of the two hinge structures 2. The recess 317a and housing space 317b jointly form the wiring passage 317 communicating with the installation space 313 and coupling space 314. Aside from the composite frame for the installation frame 311 as previously discussed, it also can be a frame formed integrally, but they are not the limitation of the invention.

More specifically, the two hinge structures 2 respectively include a fastening portion 21 fastened to the base 1 and a pintle portion 22 located in the installation portion 312 to rotate against the fastening portion 21. The pintle portion 22 has an axial aperture 221 communicating with the wiring passage 317. The signal wire 5 is coupled with the support frame 31 to thread through the wiring passage 317 and aperture 221. The rubber protective layer 32 is located on the support frame 31, and includes a buffer portion 321 bonded between the surface of the installation frame 311 and display module 4, and a holding portion 322 held in the wiring passage 317 to fix the signal wire 5 so that the signal wire 5 and the installation frame 311 form a positioning relationship. More specifically, the signal wire 5 includes a signal transmission section 51 encased by the holding portion 322 and two connection ports 52a and 52b at two ends of the signal transmission section 51. One of the two connection ports 52a is connected to the display module 4, and the other connection port 52b is connected to the base 1, thereby signals output from the base 1 can be transmitted to the display module 4 via the signal transmission section 51. By means of the structure set forth above, the holding portion 322 of the rubber protective layer 32 securely holds the signal transmission section 51 of the signal wire 5 in the wiring passage 317 so that the signal wire 5 can be coupled firmly with the support frame 31 without being pulled or bent while the support frame 31 is opened or closed against the base 1.

Figure 5A:
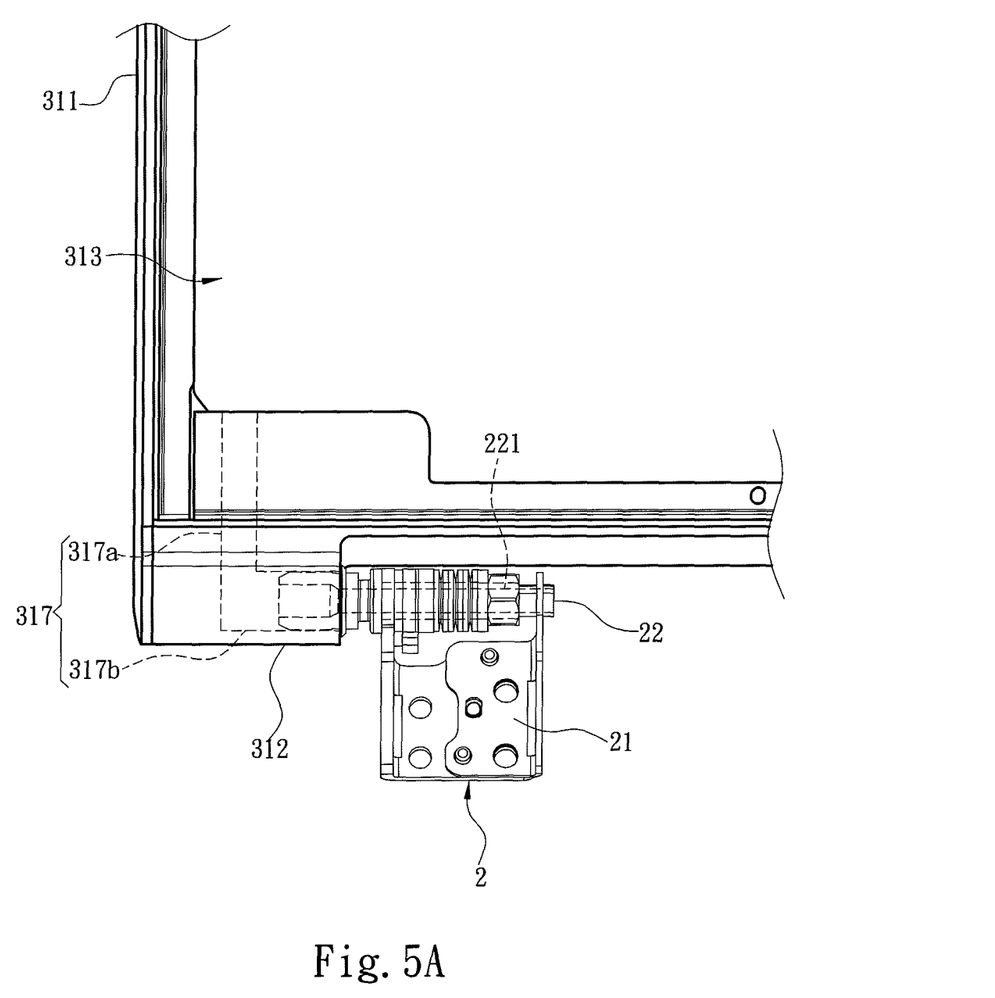
FIG. 5A is a partial schematic view of the display module holding frame of the invention before wiring.

Please also refer to FIGS. 5A to 5D, in order to form the rubber protective layer 32, the invention further provides a method for manufacturing the display module holding frame. The method includes the following steps: first, providing the support frame 31 which includes the installation frame 311 to hold the display module 4, the two installation portions 312 connecting to the installation frame 311 to hold the two hinge structures 2, the installation space 313 surrounded by the installation frame 311 and the coupling space 314 formed between the two installation portions 312. The installation frame 311 has the wiring passage 317 (as shown in FIG. 5A) communicating with the installation space 313 and coupling space 314. In this embodiment the support frame 31 is a composite frame. More specifically, a step of assembling the support frame 31 is further performed before the step of providing the support frame 31 by coupling the side frame 315 that supports the display module 4 with the bottom frame 316 that connects to the installation portions 312. More specifically, the side frame 315 is an inverted U-shaped metal frame, and the bottom frame 316 is an I-shaped metal frame. After the side frame 315 and bottom frame 316 are coupled together, the opening of the side frame 315 is sealed to form the rectangular installation frame 311 with the installation space 313 formed inside. The bottom frame 316 and side frame 315 include respectively the indented portion 318 and the connecting portion 319 at the junction to form the recess 317a communicating with the installation space 313. Each of the two installation portions 312 has the housing space 317b communicating with the recess 317a and coupling space 314 to hold one of the two hinge structures 2. The recess 317a and housing space 317b jointly form the wiring passage 317 communicating with the installation space 313 and coupling space 314.

Figure 5B:
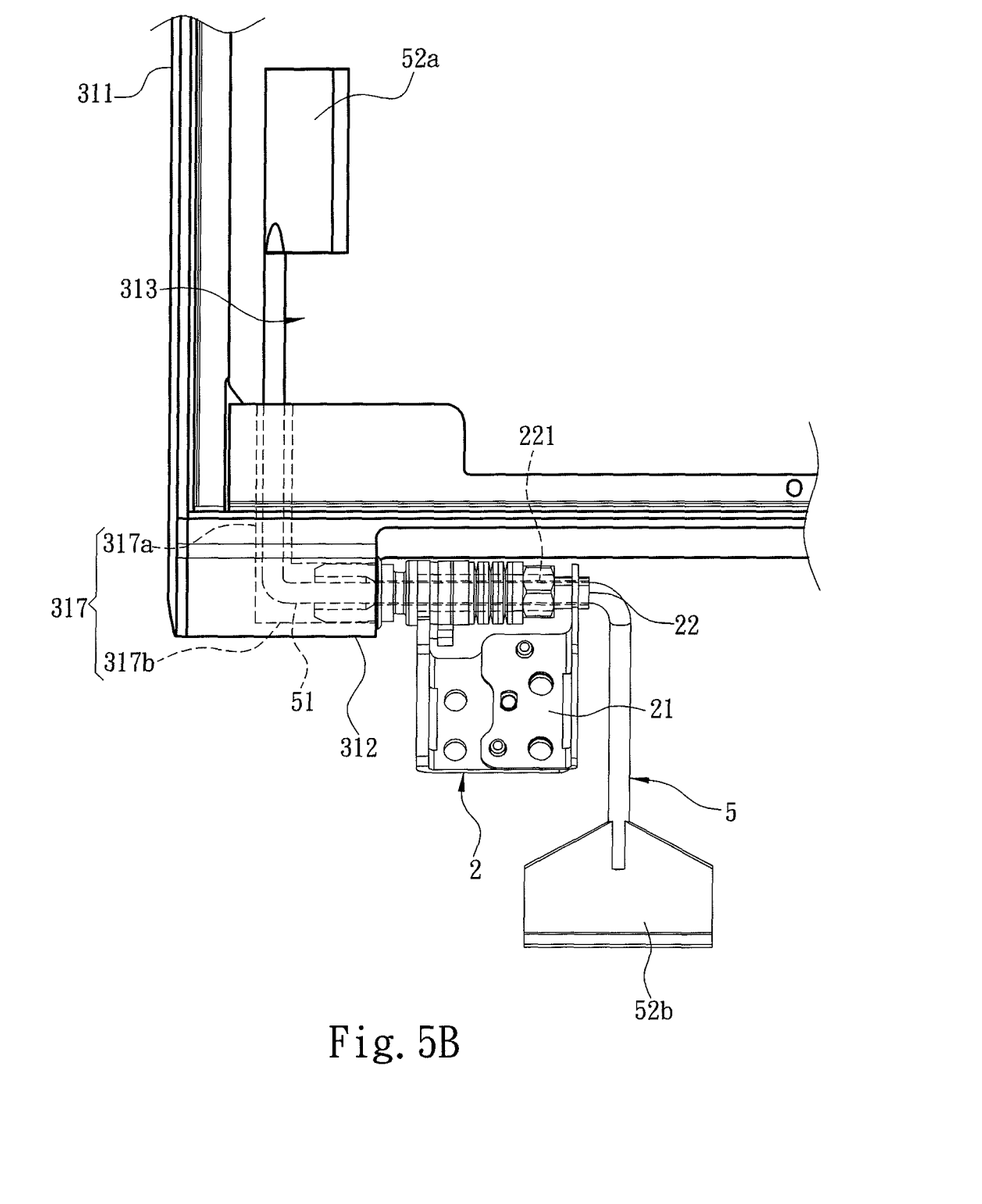
FIG. 5B is a partial schematic view of the display module holding frame of the invention after wiring.
Figure 5C:
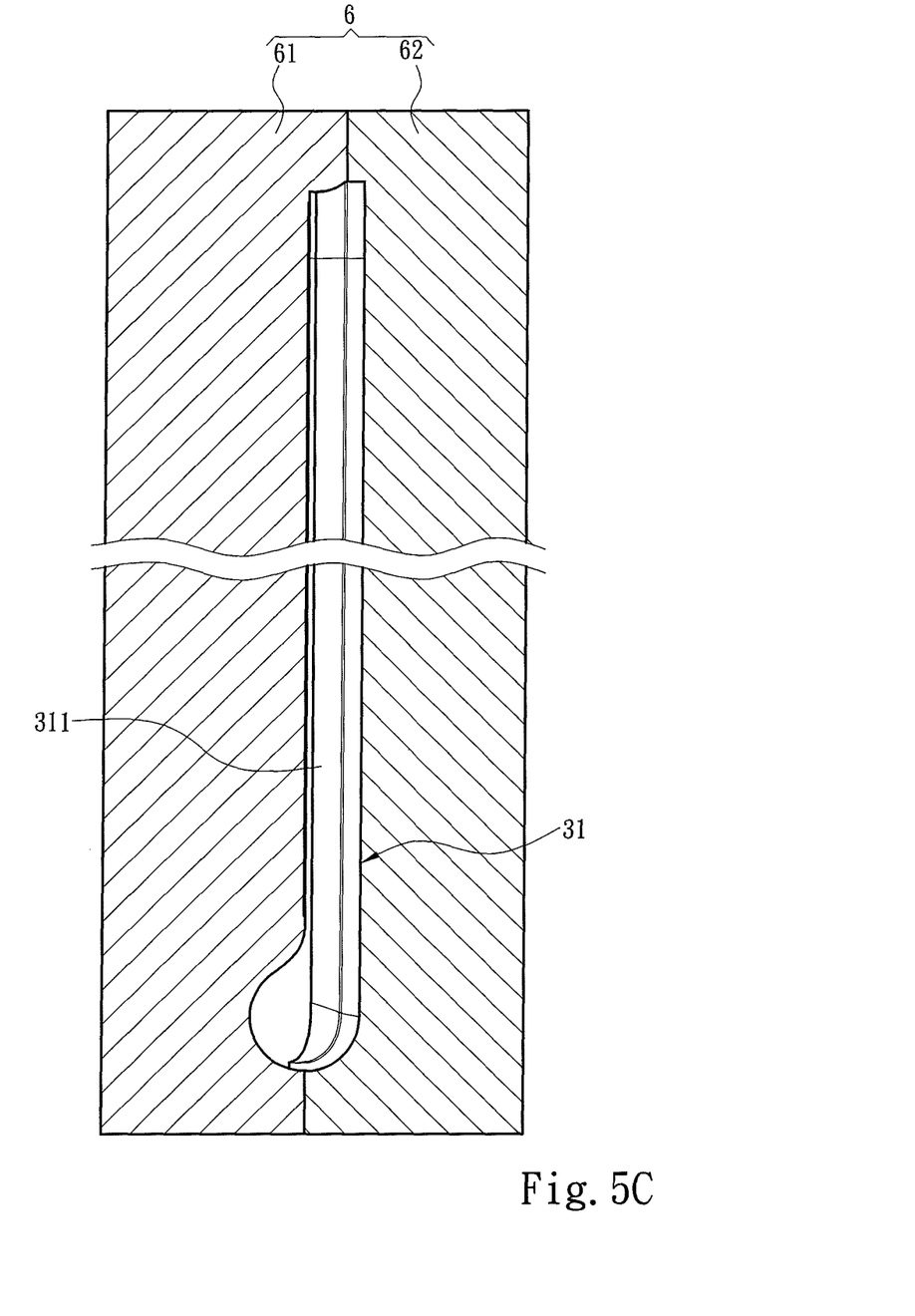
FIG. 5C is a partial schematic view of the display module holding frame of the invention before forming the rubber protective layer.
Figure 5D:
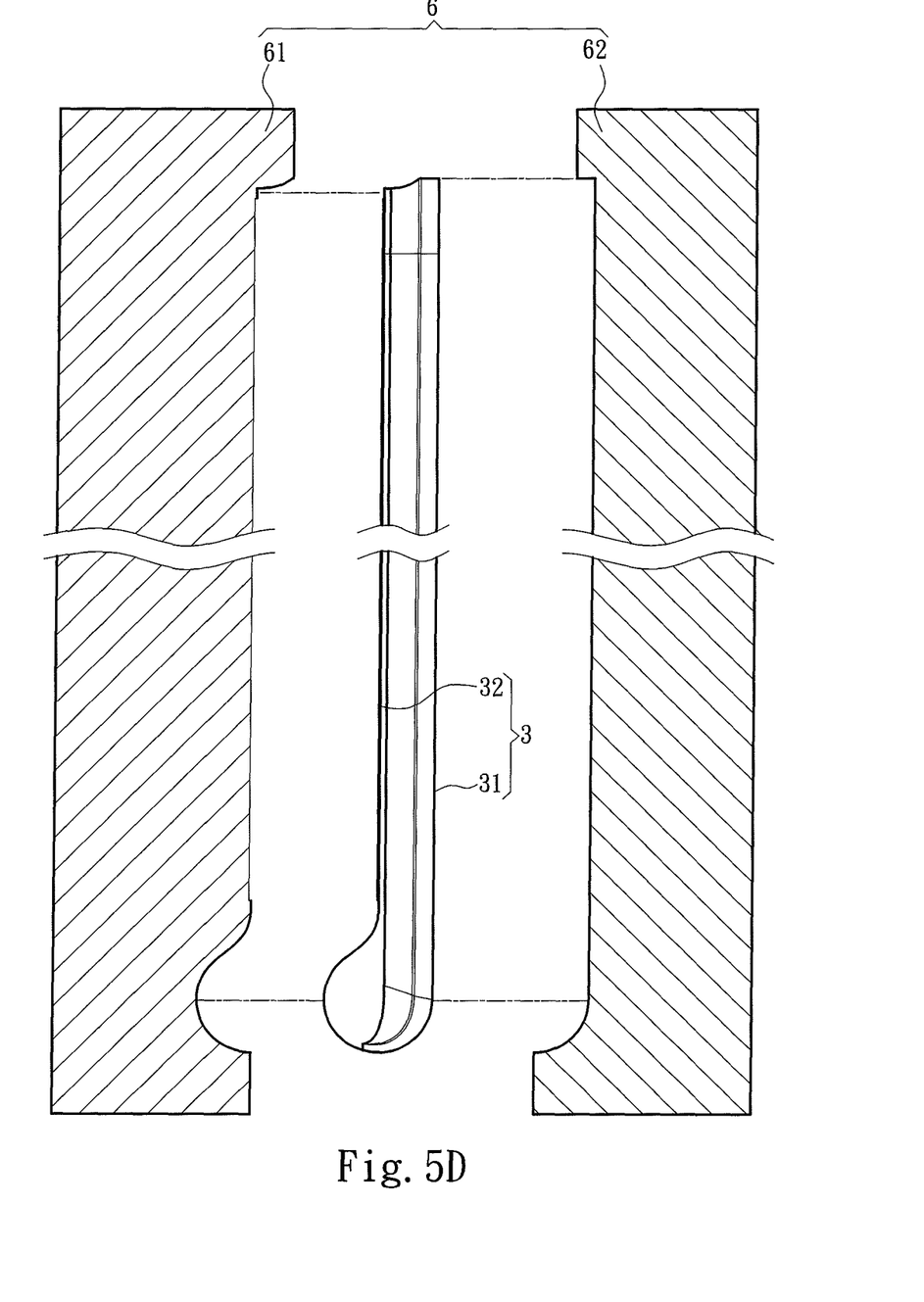
FIG. 5D is a partial schematic view of the display module holding frame of the invention after the rubber protective layer is formed.

Next, threading the signal wire 5 through the axial aperture 221 of the pintle portion 22 and also the wiring passage 317 to couple with the support frame 31 (referring to FIG. 5B). Finally, forming the rubber protective layer 32 on the surface of the installation frame 311. The rubber protective layer 32 includes the buffer portion 321 bonded between the surface of the installation frame 311 and the display module 4, and the holding portion 322 held in the wiring passage 317 to fix the signal wire 5 so that the signal wire 5 and the installation frame 311 form a positioning relationship. More specifically, the step of forming the rubber protective layer 32 on the surface of the installation frame 311 further includes the following steps: disposing the coupled support frame 31 and signal wire 5 in a mold 6 for holding a rubber material, and injecting the rubber material to the surface of the installation frame 311. The mold 6 includes a male mold 61 and a female mold 62 that are coupled together to hold the coupled support frame 31 and signal wire 5. Then, the rubber material is injected into the mold 6 so that the buffer portion 321 is formed on the surface of the installation frame 311. Next, the rubber material flows along the surface of the installation frame 311 to fill the wiring passage 317 and encase the signal wire 5 to form the holding portion 322. The signal transmission section 51 of the signal wire 5 is encased by the holding portion 322 in the wiring passage 317 without moving (also referring to FIGS. 5C and 5D).

As a conclusion, because the display module holding frame is fabricated via the method of the invention, the signal wire is securely held by the holding portion of the rubber protective layer in the support frame without moving while the support frame is opened or closed against the base. Moreover, the display module according to the invention is mounted onto the installation frame layer by layer, and the buffer portion of the rubber protective layer is located between the display module and installation frame to absorb impact caused by flipping of the display module with the display module holding frame against the base, thereby provides protection for the display module.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for manufacturing a display module holding frame located in an electronic device which includes a base and two hinge structures to pivotally couple with the base and the display module holding frame, comprising the steps of:

providing a support frame which includes an installation frame to hold a display module, two installation portions to hold the two hinge structures, an installation space formed within the installation frame, a coupling space formed between the two installation portions and located outside the installation frame, and two wiring passages each running through the installation frame and one of the installation portions and communicating with the installation space and the coupling space;

threading two signal wires through the two wiring passages respectively to couple with the support frame; and forming a rubber protective layer on the surface of the installation frame that includes a buffer portion bonded between the surface of the installation frame and the display module and two portions held in the two wiring passages to fix the two signal wires respectively so that the two signal wires and the installation frame form a positioning relationship.

2. The method of claim 1, wherein the step of forming the rubber protective layer on the surface of the installation frame further includes the steps of:

disposing the coupled support frame and the two signal wires into a mold for holding a rubber material respectively, the mold including a male mold and a female mold coupled together to hold the coupled support frame and the two signal wires; and injecting the rubber material to the surface of the installation frame to form the buffer portion and fill the two wiring passages to encase the two signal wires to form the two holding portions.

3. The method of claim 1, wherein the two hinge structures respectively include a fastening portion fastened to the base and a pintle portion located in one of the two installation portions to rotate against the fastening portion.

4. The method of claim 3 further including a step of threading the two signal wires through the two pintle portions respectively that is performed after the step of providing the support frame, each of the pintle portions including an axial aperture communicating with one of the two wiring passages to allow one of the two signal wires to thread through.

5. The method of claim 1 further including a step of assembling the installation frame that is performed before the step of providing the support frame, the installation frame including a side frame to hold the display module and a bottom frame connecting to the installation portions to form the installation space.

6. The method of claim 1, wherein the signal wire includes a signal transmission section encased by the holding portion and two connection ports located at two ends of the signal transmission section.

7. A display module holding frame located in an electronic device which includes a base and two hinge structures to pivotally couple with the base and the display module holding frame such that the display module holding frame is rotatable against the base, comprising:

a support frame which includes an installation frame to hold a display module, two installation portions connected to the installation frame to hold the two hinge structures, an installation space formed within the installation frame to hold the display module, a coupling space formed between the two installation portions and located outside the installation frame, and two wiring passages each running through the installation frame and one of the two installation portions and communicating with the installation space and the coupling space and threaded through by two signal wires respectively; and a rubber protective layer which is located on the support frame and includes a buffer portion bonded between the surface of the installation frame and the display module and two holding portions held in the two the wiring passages to fix the two signal wires respectively so that the two signal wires and the installation frame form a positioning relationship.

8. The display module holding frame of claim 7, wherein the two hinge structures respectively include a fastening portion fastened to the base and a pintle portion located in one of the two installation portions to rotate against the fastening portion.

9. The display module holding frame of claim 8, wherein each of the pintle portions includes an axial aperture communicating with one of the two wiring passages.

10. The display module holding frame of claim 7, wherein the installation frame includes a side frame to hold the display module and a bottom frame connecting to the installation portions and coupling with the side frame to form the installation space.

11. The display module holding frame of claim 7, wherein each of the signal wires includes a signal transmission section encased by one of the two holding portions and two connection ports located at two ends of the signal transmission section.

* * * * *